United States Patent [19]

Langer

[11] 4,310,439
[45] Jan. 12, 1982

[54] NOVEL TRIALKYL ALUMINUM COCATALYST

[75] Inventor: Arthur W. Langer, Watchung, N.J.

[73] Assignee: Exxon Research & Engineering Co., Florham Park, N.J.

[21] Appl. No.: 127,805

[22] Filed: Mar. 6, 1980

Related U.S. Application Data

[63] Continuation-in-part of Ser. No. 18,340, Mar. 7, 1979, abandoned, which is a continuation-in-part of Ser. No. 896,561, Apr. 14, 1978, Pat. No. 4,158,642, which is a continuation-in-part of Ser. No. 812,530, Jul. 5, 1977, Pat. No. 4,145,313, which is a continuation-in-part of Ser. No. 790,832, Apr. 25, 1977, and Ser. No. 790,837, Apr. 25, 1977.

[51] Int. Cl.$^3$ ............... C08F 4/62; C08F 4/64; C08F 4/68
[52] U.S. Cl. ............... 252/429 B; 526/125; 526/141; 526/142; 526/139; 526/140; 252/431 R; 252/431 C; 252/431 N; 252/431 P
[58] Field of Search .......... 252/429 B, 429 C, 431 R, 252/431 C, 431 N, 431 P

[56] References Cited

U.S. PATENT DOCUMENTS

| 3,663,450 | 5/1972 | Cozewith et al. | 252/429 B |
| 4,038,471 | 7/1977 | Castner | 252/429 B X |
| 4,072,809 | 2/1978 | Rogan | 252/429 B X |
| 4,158,642 | 6/1979 | Langer | 252/429 B |

*Primary Examiner*—Patrick Garvin
*Attorney, Agent, or Firm*—Richard E. Nanfeldt

[57] ABSTRACT

A new improved catalyst system for alpha-olefin type polymerizations, includes at least one metal alkyl compound having the formula $R_3''M$ in combination with a Group IVB-VIII transition metal compound on a support and at least one hindered Lewis base and at least one unhindered Lewis base wherein R is selected from the group consisting of $C_1$ to $C_{20}$ secondary or tertiary alkyl, cycloalkyl, alkenyl or aralkyl groups; M is selected from the group consisting of aluminum, gallium, or indium. The improved catalyst system provides polymers having increased isotactic stereoregularity as well as lower catalyst residue.

13 Claims, No Drawings

NOVEL TRIALKYL ALUMINUM COCATALYST

CROSS-REFERENCE TO RELATED APPLICATIONS

The present application is a continuation-in-part of U.S. Ser. No. 018,340 filed Mar. 7, 1979 and now abandoned, which is a continuation-in-part of Ser. No. 896,561 filed Apr. 14, 1978 and now U.S. Pat. No. 4,158,642 which is a continuation-in-part of Ser. No. 812,530, filed July 5, 1977 and now U.S. Pat. No. 4,145,313 which is a continuation-in-part of Ser. Nos. 790,832 and 790,837 filed Apr. 25, 1977.

BACKGROUND OF THE INVENTION

1. Field of the Invention

A new improved catalyst system for alpha-olefin type polymerizations includes at least one organo metal compound having the formula R'''M in combination with a Group IVB-VIII transition metal compound on a support, at least one unhindered Lewis base and at least one hindered Lewis base wherein R''' is selected from the group consisting of $C_1$ to $C_{20}$ primary, secondary or tertiary alkyl, alkenyl or aralkyl groups, or a hydride, and M is selected from the group consisting of aluminum, gallium or indium. The improved catalyst system provides polymers having increased isotactic stereoregularity as well as lower catalyst residue.

2. Description of the Prior Art

There is extensive art on the polymerization of ethylene and higher alpha-olefins, including dienes, using Ziegler-type catalysts containing either alkyl metals or alkyl metals in which an alkyl groups has been replaced by X, OR'', SR'', NR''$_2$, etc., in combination with a transition metal compound of Groups IVB-VIII, where X=halide, and R''=$C_1$ to $C_{20}$ hydrocarbyl substituent.

It is well known to use various alkyl aluminum compounds in combination with transition metal compounds of Groups IVB-VIII in Ziegler-type polymerizations of alpha olefins. For stereospecific polymerization of propylene and higher alpha olefins, the most effective commercially used alkyl metal compounds are AlEt$_3$ and AlEt$_2$Cl, although Al(n-Pr)$_3$, Al(n-Bu)$_3$, Al(i-Bu)$_3$ and Al(iBu)$_2$H give similar results. Longer chain alkyl aluminums, such as Al(n-C$_6$)$_3$, Al(n-C$_8$)$_3$, (n-C$_8$)$_2$AlCl, etc., drastically reduce stereospecificity as shown by much lower heptane insolubles (Ziegler and Montecatini, Belgian Pat. No. 543,259).

This invention claims a novel catalyst system for stereospecific polymerization of propylene and higher alpha olefins to isotactic polymers. The new compositions include a Group IVB-VIII transition metal compound on a layer lattice support, at least one triorganometal compound of aluminum, gallium or indium, at least one unhindered Lewis base, and at least one hindered Lewis base. Higher activity and/or isospecificity is obtained than with the conventional di- or tri-alkyl metal compounds used in combination with the various types of supported transition metal catalysts, such as MgCl$_2$-supported TiCl$_4$, supported TiCl$_3$, etc., with or without other conventional catalyst modifiers present such as Lewis bases, alcohols, phenols, polymers, dispersants, binders and other additives.

A number of patents have been issued on the use of trialkyl metal compounds as cocatalyst for the polymerization of various monomers. These patents which are distinguishable from the instant invention are U.S. Pat. No. 3,953,414; Belgium Pat. No. 845,593; Belgium Pat. No. 846,314; German DT No. 2620-886; British Pat. No. 1,335,887; German DT No. 2630-585; British Pat. No. 1,140,659; German DT No. 2612-650; South African Pat. No. 7,503,470; German DT No. 2355-886; Japanese Pat. No. 51064-586; South African Pat. No. 7507-382; German DT No. 2638-429; Japanese Pat. No. 51057-789; U.S. Pat. No. 3,992,322; Japanese Pat. No. 52027-090; and U.S. Pat. No. 3,400,110.

Other patents which are distinguishable from the instant invention are U.S. Pat. No. 4,039,472; British Pat. No. 1,489,599; British Pat. No. 1,490,509; Japanese Pat. No. 1136-625; JA 7008 982-R; and Belgium Pat. No. 735,291.

It is also well known in the art to use various unhindered Lewis bases in combination with both unsupported and supported Ziegler-type catalysts to improve stereospecificity. Representative examples of such patents include U.S. Pat. No. 3,238,146; U.S. Pat. No. 4,107,413; British Pat. No. 1,001,820; U.S. Pat. No. 4,107,416; and German DT No. 2504-036.

These patents all fail to teach or suggest either the novel compositions or the improved polymerization results obtained with the compositions of this invention.

SUMMARY OF THE INVENTION

The present invention relates to unique and novel catalyst systems for the conventional alpha olefin type polymerization at significantly improved polymerization activity, wherein the resultant polymers have a high degree of isotactic stereoregularity.

An object of my present invention is to provide improved catalyst systems having a major increase in polymerization activity while being able to control over a wide range the polymer crystallinity, e.g., isotacticity, wherein the catalyst system includes a transition metal compound on a support, a metal trialkyl compound of Al, Ga or In, at least one unhindered Lewis base and at least one hindered Lewis base.

A further object of my present invention is to provide an improved process for alpha-olefin type polymerizations, wherein the polymerization activity is increased and the formed polymer has a high degree of isotactic stereoregularity and a minimum amount of catalyst residues are formed.

A still further object of my present invention is to use directly the new improved catalyst with various types of supported transition metal compounds without substantial modification of the commercial catalyst preparation or the polymerization plant.

A still further object of my present invention is to provide new improved catalyst compositions wherein the isotacticity of the formed polymer is much less sensitive to a ratio of the cocatalyst (trialkyl metal compound) to the transition metal compound than when the conventional cocatalysts are used, thereby greatly facilitating process control to make higher quality polymers at more efficient production rates.

GENERAL DESCRIPTION

It is well known in the art to use an alkyl metal compound of Groups I-III in combination with a transition metal compound of Groups IVB-VIII as a catalyst system for olefinic polymerization. While nearly all of the alkyl metal compounds are effective for the polymerization of ethylene, only a few are effective for the preparation of isotactic polymers of propylene and higher alpha olefins and only Et$_2$AlCl, AlEt$_3$ and i-Bu$_2$AlH have any important commercial utility.

A major cost involved in the polymerization of the alpha olefins is the cost of the catalyst components. Therefore, the cost of the manufacture of the polymer can be effectively reduced by the use of catalyst systems having a higher polymerization activity. A further concern is the ability to produce polymers having a minimum amount of catalyst residues thereby eliminating a costly deashing operation. A still further concern is the ability to produce polymers having a high degree of isotactic stereoregularity thereby enabling the manufacturer to eliminate or reduce the costly operation involving the removal and separation of atactic polymer from the isotactic polymer. The improved catalyst system of the present instant invention provides a means to the manufacturer of obtaining these desirable realizations.

The improved catalyst systems of the present invention which are employed in alpha olefin polymerizations include a Group IVB-VIII transition metal compound on a support, one or more unhindered Lewis bases, at least one metal alkyl compound at least one of which is a metal trialkyl compound of Al, Ga or In, and at least one hindered Lewis base.

The transition metal catalyst compound is a Group IVB-VIII transition metal halide, wherein the halide group is chloride or bromide and the transition metal halide is in the form of solid crystalline compounds, solid solutions or compositions with other metal salts or supported on the surface of a wide range of solid supports. For highest stereospecificity it is desirable to have the transition metal halide, or its support composition, in the layer lattice structure with very small crystallites, high surface area, or sufficient defects or foreign components to facilitate high dispersion during polymerization. The transition metal halide may also contain various additives such as Lewis bases, pi bases, polymers or organic or inorganic modifiers. Vanadium and titanium halides such as VCl$_3$, VBr$_3$, TiCl$_3$, TiCl$_4$, TiBr$_3$ or TiBr$_4$ are preferred, most preferably TiCl$_3$ or TiCl$_4$ and mixtures thereof. The most preferred TiCl$_3$ compounds are those which contain TiCl$_4$ edge sites on a layer lattice support such as alpha, delta, or gamma TiCl$_3$ or various structures and modifications of TiCl$_3$, MgCl$_2$ or other inorganic compounds having similar layer lattice structures. The most preferred TiCl$_4$ compounds are those supported on chloride layer lattice compounds such as MgCl$_2$. Other anions may be also present, such as other halides, pseudo-halides, alkoxides, hydroxides, oxides or carboxylates, etc., providing that sufficient chloride is available for isospecific site formation. Mixed salts or double salts such as K$_2$TiCl$_6$ or MgTiCl$_6$ can be employed alone or in combination with electron donor compounds. The most preferred transition metal compound is TiCl$_4$ containing MgCl$_2$ especially in the presence of Lewis bases (electron donor compounds).

The Lewis bases can be employed in combination with the trialkyl metal compound or with the Group IVB-VIII transition metal compound or with both components as long as they do not cause excessive cleavage of metal-carbon bonds or loss of active sites. A wide variety of both unhindered and hindered Lewis bases may be used including such types as tertiary amines, esters, phosphines, phosphine oxides, phosphates (alkyl, aryl), phosphites, hexaalkyl phosphoric triamides, dimethyl sulfoxide, dimethyl formamide, secondary amines, ethers, epoxides, ketones, saturated and unsaturated heterocycles, or cyclic ethers and mixtures thereof. Typical but non-limiting examples are diethyl ether, dibutyl ether, tetrahydrofuran, ethyl acetate, methyl p-toluate, ethyl p-anisate, ethyl benzoate, phenyl acetate, amyl acetate, methyl octanoate, acetophenone, benzophenone, triethyl amine, tributyl-amine, dimethyl decylamine, pyridine, N-methylpiperidine, 2,2,6,6-tetramethylpiperidine and the like. Although unhindered Lewis bases are preferred in the preparation of the supported transition metal catalyst component, hindered Lewis bases are preferably used in combination with the trialkyl metal cocatalyst. Hindered Lewis bases are those whose complexing ability toward the cocatalyst is hindered sufficiently by steric and/or electronic effects to cause appreciable dissociation of the trialkyl metal-Lewis base complex under polymerization conditions. Although a wide range of mole ratios may be used, dissociation measured on a 1:1 complex is normally in the range of 5-95%, preferably greater than about 10% and less than about 90%. Steric hindrance is achieved by bulky substituents around the heteroatom which reduces the accessibility of the base functionality to the Lewis acid, that is, the trialkyl metal compound. Electronic hindering (weakening) is obtained by placing electron withdrawing substituents on the heteroatom to reduce the electron density on the basic heteroatom. Aromatic substituents are especially useful because they are relatively unreactive toward other catalyst components. Hindered Lewis bases derived from piperidines, pyrrolidines, ketones, tetrahydrofurans, secondary and tertiary aromatic amines and tertiary aliphatic amines are preferred, with the hindered nitrogen bases being most preferred. Non-limiting examples of sterically hindered bases include 2,2,6,6-tetramethylpiperidine, 2,2,5,5-tetramethylpyrrolidine, 2,2,5,5-tetramethyltetrahydrofuran, di-tert-butylketone, 2,6-diisopropyl-piperidine, ortho-tolyl t-butylketone, methyl 2,6-di-tert-butylphenylketone, diisopropylethylamine, t-butyldimethylamine, 6-methyl-2-isopropyl pyridine, and the like. Electronically hindered Lewis bases include diphenylamine, di-ortho-tolylamine, N,N-diethylaniline, di-orthotolylketone, and the like. Since aromatic substituents are also bulky, some of the electronically hindered bases also have a steric contribution to the hindrance. Especially preferred hindered amines are 2,2,6,6-tetramethyl-piperidine, 2,2,5,5-tetramethylpyrrolidine and the diarylamines. Completely hindered bases, such as 2,6-di-tertiary-butylpyridine, and the like, which complex the alkyl metal cocatalyst too weakly, are ineffective for improving stereospecificity and are excluded from this invention.

Unhindered Lewis bases have fewer and smaller substituents than hindered bases adjacent to the heteroatom such that their complexes with the trialkyl metal cocatalyst are too strong to permit sufficient dissociation under polymerization conditions to activate the catalyst or improve stereospecificity. Examples of conventional, unhindered, Lewis bases include di-n-alkyl ethers, n-alkyl esters of alkyl or aryl carboxylic acids, di-n-alkyl ketones, diaryl ketones unsubstituted in the ortho positions, secondary and tertiary n-alkyl amines, piperidines containing less than three methyl groups or the equivalent steric bulk in the 2 and 6 positions, pyridines containing less than two t-butyl groups or the equivalent steric bulk in the 2 and 6 positions, and the like. Non-limiting examples of unhindered Lewis bases include dibutyl ether, ethyl acetate, ethyl p-anisate, ethyl benzoate, benzophenone, tributyl amine, 2-isopropylpyridine, 2,6-diethylpyridine, 2,6-dimethylpiperidine, 2,5-dimethyltetrahydrofuran, and all related compounds containing less steric hindrance than the above examples. Obviously a somewhat less hindered base may be used in combination with a more hindered alkyl metal compound to achieve the desired dissociation.

Salts of Group IA-IIIA metals may also be employed with the instant catalysts if they are partially or wholly solubilized by reaction with the alkyl metal components. Preferred are the carboxylates, alkoxides and aryloxides of Groups IIA-IIIA metals, more preferably magnesium and aluminum. Non-limiting examples include $Mg(OOCR'')_2$, $R''OMgOOCR''$, $ClMgOR''$, $Mg(OR'')_2$, $R''_2AlOOCC_6H_5$, $R''Al(OOCR'')_2$, $R''_2AlOR''$, and the like, where $R''$ is a hydrocarbyl group. Most preferred are the alkoxide and carboxylate salts of magnesium and aluminum prepared in situ by reacting the organometal compounds with $R''OH$ or carboxylic acids in hydrocarbon solvents. Sterically hindered alkoxides and aryloxides are especially preferred, where $R''$=t-butyl, t-amyl, 1,1-diethylpropyl, 1,1-diethylbenzyl, 2,6-di-tert-butylphenyl, 1,1-diphenylpropyl, triphenylmethyl, and the like.

The trialkyl metal compounds useful in this invention have the formula $R'''_3M$ wherein M=Al, Ga or In, and $R'''$ is selected from the group consisting of a $C_1$–$C_{20}$ primary, secondary or tertiary alkyl, branched primary alkyl, cycloalkyl, alkenyl or aralkyl group and mixtures thereof, more preferably at least one alkyl group having at least two carbon atoms, and most preferably having 2 to 4 carbon atoms. Preferred cocatalysts contain 1-2 secondary or tertiary hydrocarbyl groups. The salt of the Group IA-IIIA metal is used at a molar ratio of about 1 to 50 to about 50 to 1 moles of the salt of Group IA-IIIA metal per mole of the trialkylaluminum compound $R''_3Al$, preferably about 1 to 10 to about 10 to 1 moles when the oxygen-containing group is alkoxide or aryloxide, and most preferably less than 1 to 1 when these groups are hindered. When the group is carboxylate, the ratio is about 0.1 to 1, preferably about 0.1 to 0.5 carboxylate groups per mole of the trialkyl metal compound. The use of these Group IA-IIIA metal salts is preferably with the supported titanium catalyst systems as embodied in the instant invention.

The conventional trialkyl metal cocatalysts ($R'''_3M$) useful in this invention include $AlEt_3$, Al n-$Pr_3$, Al n-$Bu_3$, Al i$Bu_3$, Al trihexyl, Al tridecyl, Al i$Bu_2$H, Al tri-isoprenyl, Al tribenzyl, $GaEt_3$, Ga n-$Bu_3$, $InEt_3$, and mixtures thereof containing more than one type of $R'''$ group or more than one metal.

The preferred cocatalysts of the instant invention have the general formula $R_nMR'_{3-n}$ wherein M=Al, Ga or In, R is a secondary or tertiary hydrocarbyl group selected from the group consisting of a $C_3$–$C_{20}$ secondary or tertiary alkyl, cycloalkyl, alkenyl or aralkyl group, R' is selected from the group consisting of $C_1$–$C_{20}$ primary alkyl, alkenyl or aralkyl or hydride; and n=1-3, preferably 1-2, and most preferably n=2. Preferably, R' is $C_2$–$C_{10}$ primary alkyl or aralkyl, or hydride with the restriction that not more than one hydride group may be present; most preferably R' is $C_2$–$C_4$ primary alkyl. The R group is preferably about a $C_4$–$C_{16}$ secondary or tertiary alkyl group or cycloalkyl group and is most preferably one which is not readily susceptible to elimination or displacement by monomer during polymerization. In addition to the simple secondary alkyl groups, other groups are also effective in which the aluminum is attached to a secondary or tertiary carbon atom, i.e., cyclohexyl, cyclooctyl, tert-butyl, tert-amyl, s-norbornyl, and the like. The most preferred compositions have the formula $R_nAlR'_{3-n}$ in which the secondary and tertiary alkyl groups contain 4-10 carbons and n=2. Mixtures of the cocatalysts of this invention with conventional alkyl metal cocatalysts also yields improved results.

Suitable non-limiting examples of preferred cocatalysts include i-$Pr_2AlEt$, s-$BuAlEt_2$, s-$Bu_2AlEt$, t-$BuAlEt_2$, t-$Bu_2AlEt$, s-$Bu_3Al$, 1,1-dimethylheptyl $AlEt_2$, s-$Bu_2Aln$-$C_{16}H_{33}$, t-$Bu_2AlCH_2C_6H_5$, s-Bu(t-Bu)AlN-Bu, cyclohexyl$_2AlEt$, s-pentyl Ali-$Bu_2$, t-$Bu_2AlMe$, t-$Bu_2Aln$-$C_8H_{17}$, (2-ethylcyclopentyl)$_2$-AlEt, 2-(3-ethylnorbornyl)$AlEt_2$, 2-norbornyl Ali-$Bu_2$, (2-norbornyl)$_2$, Ali-Bu, acenaphthyl Ali-$Bu_2$, cyclooctyl (i-Bu) AlH, 3-ethyl-5-ethylidinenorbornyl $AlEt_2$, 9-i-bu-9-alumino-3,3,1-bicyclononane, s-$Bu_2AlH$, t-$Bu_2AlH$, t-$Bu_2InEt$, s-$Bu_2$-GaEt, neopentyl $AlEt_2$, neopentyl$_2$ AlEt and the like.

The most preferred compounds include those in the above list which have the formula $R_{1-2}AlR'_{2-1}$, especially those having the formula $R_2AlR'$.

One method of preparing these secondary alkyl aluminum compounds is to react internal olefins with Ali-$Bu_3$ or i-$Bu_2AlH$ to add Al-H across the double bond to form alkyl aluminum compounds. When the double bond is in a strained ring compound, $AlR_3$ may be used to add Al-R across the double bond and obtain preferred compounds which are very resistant to displacement or elimination. Strained ring olefins include cyclopentane, norbornene, norbornadiene, ethylidene norbornene, dicyclopentadiene, and the like. This method is preferred because of raw material availability and simplicity of reaction, although this invention is not limited by the method of synthesis.

Other methods include the direct synthesis from the reactive metals and the secondary or tertiary halides, the various organometallic synthesis involving ligand exchange between Al, Ga or In compounds and secondary or tertiary alkyl metal compounds of more electropositive metals such as Groups IA and IIA, and the reaction of the metals with the alkyl mercury compounds. Particularly useful is the general reaction of secondary or tertiary alkyl lithium compounds with $R'MX_2$ or $R'_2MX$ because it takes place readily in dilute hydrocarbon solutions.

Although di-secondary alkyl aluminum compounds are preferred to mono-secondary alkyl compounds, the monoalkyl types become more effective the greater the steric bulk of the group as long as it does not interfere with active site formation or lead to decomposition under reaction conditions.

For the alkyl metal cocatalysts of this invention, the most preferred transition metal compounds contain $TiCl_4$ supported on $MgCl_2$ and one or more Lewis bases. The concentration of the transition metal in the polymerization zone is about 0.001 to about 5 mM, preferably less than about 0.1 mM.

The molar ratio of the trialkyl metal compound to the transition metal compound is about 0.5:1 to about 200:1 or higher, more preferably about 5:1 to about 100:1. The molar ratio of Lewis base to organometal compound can vary widely but is preferably about 0.1:1 to 1:1. However, the hindered Lewis bases may be added in greater than equimolar amounts, from about 0.1 to 1 to about 10 to 1 moles per mole of organometal compound, to obtain higher stereospecificity without a major loss of activity which would occur with unhindered bases.

Surprisingly, it has been found that the Group IA-IIIA salts may be omitted when a hindered Lewis base is used together with the trialkyl metal cocatalyst. Both high activity and high stereospecificity are obtained when the Lewis base is sufficiently hindered to prevent poisoning the stereospecific catalyst sites. In such cases, an excess of the hindered base over the alkyl metal cocatalyst still produces high activity, whereas an excess of the less hindered bases completely kills the catalyst. The desired steric hindrance is the same as defined above for dissociation from the trialkyl metal compound.

The catalyst system of the invention enables the process for making alpha olefin polymers having a high degree of isotactic stereoregularity to be carried out at a temperature of about 25° to about 150° C., more preferably about 40° to about 80° C., at pressures of about 1 atm. to about 50 atm. The reaction time for polymerization is about 0.1 to about 10 hours, more preferably about 0.5 to about 3 hours. Due to the high catalyst activity, shorter times and temperatures below 80° C. can be readily employed.

The reaction solvent for the system can be any inert paraffinic, naphthenic or aromatic hydrocarbon such as benzene, toluene, xylene, propane, butane, pentane, hexane, heptane, cyclohexane, and mixtures thereof. Preferably, excess liquid monomer is used as solvent. Gas phase polymerizations may also be carried out with or without minor amounts of solvent.

Typical, but non-limiting examples of $C_2$–$C_{20}$ alpha olefinic monomers employed in the present invention for the manufacture of homo-, co- and terpolymers are ethylene, propylene, butene-1, pentene-1, hexene-1, octadecene-1, 3-methylbutene-1, styrene, ethylidene norbornene, 1,5-hexadiene and the like and mixtures thereof. Isotactic polymerization of propylene and higher olefins is especially preferred, including block copolymerizations with ethylene.

The trialkyl metal compound and the supported transition metal compound can be added separately to the reactor or premixed before addition to the reactor, but are preferably added separately.

An alternate embodiment of the instant invention with respect to the preparation of cocatalysts having the formula $R_nMR'_{3-n}$ is to use directly the reaction product of $R_2Mg + R'MX_2 \rightarrow R_2MR' + MgX_2$ as exemplified in U.S. Ser. No. 790,832; or $RMgX' + R'_2MX \rightarrow RMR'_2 + MgXX'$ as exemplified in U.S. Ser. No. 790,837, wherein the instant application is a continuation-in-part application of both U.S. Ser. Nos. 790,832 and 790,837 which were both filed Apr. 25, 1975.

In the case of the formation of $R_2MR'$, the metal di- or trihalide compounds which are used are selected from the group consisting essentially of a metal halide compound selected from the group consisting of $R'MX_2$, $MX_3$ and mixtures thereof, wherein M is selected from the group consisting of Al, Ga, and In, R' is selected from the group consisting of $C_1$ to $C_{20}$ primary alkyl, alkenyl or aralkyl groups or hydride; X is selected from the group consisting of chloride, bromide or a monovalent anion which cannot initiate polymerization of olefinic monomers, wherein the anion is selected from the group consisting of alkoxide, phenoxide, thioalkoxide, carboxylate, etc. and mixtures thereof. Typical but non-limiting examples are ethyl aluminum dichloride, aluminum trichloride, ethyl aluminum dibromide, ethyl chloroaluminum bromide, octayl aluminum dichloride, ethyl indium dichloride, butyl aluminum dichloride, benzyl aluminum dichloride, ethyl chloroaluminum butoxide, and mixtures thereof. Mixtures of metal halide compounds can be readily employed.

The $C_2$ to $C_4$ alkyl aluminum dihalides are most preferred for high stereospecificity and the monoalkylaluminum dichlorides are most preferred.

The diorganomagnesium compound has the general formula $R_2Mg$ wherein R can be the same or different and is selected from the group consisting of $C_3$ to $C_{20}$, secondary or tertiary alkyl, cycloalkyl, aralkyl or alkenyl groups. Typical, but non-limiting examples are (s-Bu)$_2$Mg, (t-Bu)$_2$-Mg or (i-Pr)2Mg. Mixtures of diorganomagnesium compounds can be readily employed providing at least one secondary or tertiary group is present. The most preferred organic groups are secondary and tertiary alkyl groups, e.g. t-Bu or s-Bu.

The molar ratio of the alkyl metal halide compound (R'MX$_2$) to the diorganomagnesium compound is about 0.5:1 to about 2:1, more preferably about 0.7:1, and most preferably about 1:1. For the MX$_3$ compound the ratio is about 1:1 to 1:3, most preferably about 2:3. The molar ratio of the metal halide compound or the diorganomagnesium compound to the transition metal compound is less than about 200:1 or higher and more preferably less than about 100:1.

The metal halide compound and diorganomagnesium compound can be added separately to the reactor containing the transition metal compound but are preferably premixed before the addition to the reactor. Employing either the metal halide compound or the diorganomagnesium compound alone with the transition metal compound does not provide the improved catalyst efficiency and stereospecificity as envisioned in this application. In order to attain this, it is necessary to employ both the metal halide compound and diorganomagnesium compound in combination with the transition metal compound in the critical proportions as previously defined. The concentration of the transition metal in the polymerization zone is about 0.001 to about 5 mM, preferably less than about 0.1 mM.

In the case of the formation of RMR'$_2$, the metal alkyl compounds which are used are selected from the group consisting essentially of a metal alkyl compound selected from the group consisting of R'$_2$MX or R'$_3$M and mixtures thereof, wherein M is selected from the group consisting of Al, Ga and In, R' is selected from the group consisting of $C_1$ to $C_{20}$ primary alkyl, alkenyl, aralkyl or hydride groups; X is selected from the group consisting of a monovalent anion which cannot initiate polymerization of olefins, such as F, Cl, Br, OR", SR", and OOCR", wherein R" is selected from the group consisting of $C_1$ to $C_{20}$ alkyl, branched alkyl, cycloalkyl, aryl, naphthenic, aralkyl and alkenyl groups, X is more preferably Cl or Br and most preferably Cl. Typical but non-limiting examples are diethyl aluminum chloride, aluminum triethyl, diethylaluminum bromide, diethylaluminum iodide, diethylaluminum benzoate, diisobutylaluminum hydride, dioctylaluminum chloride, diethylgallium butoxide, diethylindium neodecanoate, triethylindium, dibenzylaluminum chloride and mixtures thereof. Mixtures of metal alkyl compounds can be readily employed. The $C_2$ to $C_4$ alkyl aluminum compounds are preferred for high stereospecificity, and the dialkyl aluminum chlorides are most preferred.

The mono-organomagnesium compound has the general formula RMgX wherein R is selected from the group consisting of $C_3$ to $C_{20}$ secondary or tertiary alkyl, cycloalkyl, aralkyl or alkenyl groups. X is selected from the group consisting of an anion which cannot initiate polymerization of olefins, such as Cl, Br, OR'', SR'', and OOCR'', wherein R'' is selected from the group consisting of $C_1$ to $C_{20}$ alkyl, branched alkyl, cycloalkyl, naphthenic, aryl, aralkyl, allyl and alkenyl groups. Typical, but non-limiting examples are s-BuMgCl, t-BuMgCl, s-BuMgOOCC$_6$H$_5$, or s-BuMgOC$_{15}$H$_{31}$, and mixtures thereof. Mixtures of organomagnesium compounds can be readily employed. The most preferred X groups are OR'' and OOCR'' and the most preferred R groups are secondary or tertiary alkyls.

The molar ratio of the organomagnesium RMgX compound to the metal alkyl compound (R'$_2$MX or R'$_3$M) is about 2 to 1 to about 1 to 2, most preferably about 1 to 1. The molar ratio of the metal alkyl compound or the organomagnesium compound to the transition metal compound is less than about 200 to 1 or higher and more preferably less than about 100 to 1.

The metal alkyl compound (R'$_2$MX or R'$_3$M) and organomagnesium compound RMgX can be added separately to the reactor containing the transition metal compound but are preferably premixed before addition to the reactor. Employing either the metal alkyl compound or the organomagnesium compound alone with the transition metal compound does not provide the improved catalyst efficiency and stereospecificity as envisioned in this application. In order to attain this, it is desirable to employ both the metal alkyl compound and organomagnesium compound in combination with the transition metal compound in the proportions previously defined. The concentration of the transition metal in the polymerization zone is about 0.001 to about 5 mM, preferably less than about 0.1 mM.

DETAILED DESCRIPTION OF THE PREFERRED EMBODIMENTS

The advantages of the unique and novel catalyst system and the novel process for the alpha olefin polymerizations of the present instant invention can be more readily appreciated by reference to the following examples and tables.

EXAMPLE 1

An aluminum alkyl compound containing both sec-butyl and ethyl groups was prepared by mixing equimolar amounts of (sec-butyl)$_2$Mg.0.16 Et$_2$O and ethyl aluminum dichloride in heptane, heating to 65° C., 15 min., separating the magnesium chloride solids and vacuum stripping the clear solution. NMR analysis indicated the compositions Bu$_2$AlEt.0.45Et$_2$O. Metals analysis showed that only 0.50% Mg was present in this fraction.

The above liquid alkyl aluminum compound (0.2 g) was used as cocatalyst with 0.2 g catalyst prepared by reacting anhydrous MgCl$_2$ (5 moles) with TiCl$_4$.C$_6$H$_5$COOEt (1 mole) in a ball mill 4 days, followed by a neat TiCl$_4$ treat at 80° C., 2 hours, washed with heptane and vacuum dried. The catalyst contained 2.68% Ti. Propylene was polymerized in 500 ml n-heptane at 65° C., 1 hour at 765 to 770 mm. Polymerization rate was 130 g/g catalyst/hour and the polymer insoluble in boiling heptane=97.6%.

EXAMPLE 2

Three alkyl aluminum compounds containing sec-butyl groups were prepared by reacting the proper stoichiometric amounts of sec-butyl lithium in heptane with either ethyl aluminum dichloride or diethylaluminum chloride, heating to boiling, filtering the insoluble LiCl, and vacuum stripping the clear solutions. Nearly theoretical yields were obtained of s-BuEtAlCl (A), s-Bu$_2$EtAl (B) and s-BuEt$_2$Al (C). Compositions were established by $^1$H and $^{13}$C NMR and by G.C. analysis of the alkyl fragments.

Polymerizations were carried out as in Example 1 using 1 mmole aluminum alkyl compound and 0.2 g of the supported TiCl$_4$ catalyst. The results summarized in Table I are compared to those obtained using the control ethyl aluminum compounds. In all three runs with sec-butyl alkyls, both activity and stereospecificity (heptane insolubles) were higher than those obtained with the conventional ethyl aluminum compounds. The trialkyls were far superior to the dialkyl aluminum chlorides and the di-sec-butyl aluminum ethyl was clearly superior to the mono-sec-butyl aluminum diethyl compound.

TABLE I

| Run | Al Alkyl | Rate g/g Cat/hour | % HI |
|---|---|---|---|
| A | Et$_2$AlCl control | 48.9 | 68.0 |
| B | s-Bu$_{1.07}$EtAlCl$_{0.93}$ | 64.6 | 79.1 |
| C | Et$_3$Al control | 344 | 83.1 |
| D | s-BuEt$_2$Al | 380 | 90.3 |
| E | s-Bu$_2$EtAl | 357 | 93.0 |

EXAMPLE 3

Sec-pentyl aluminum diisobutyl was prepared by reacting 19.57 g i-Bu$_2$AlH with 75 ml pentene-2 in a glass lined 300 cc bomb at 135°–140° C. for 16 hours, then 150° C. for 7 hours. The solution was vacuum stripped at 25° C., yielding 28.1 g of the neat sec-pentyl aluminum compound.

Propylene was polymerized as in Example 2 using 0.212 g (1 mmole) sec-pentyl aluminum diisobutyl as cocatalyst. Polymerization rate was 383 g/g Cat/hr and % HI=92.7. Comparison with AlEt$_3$ control (Ex. 2, Run C) shows that the sec-pentyl aluminum compound gave substantial improvement, particularly in stereospecificity.

EXAMPLE 4

The alkyl metal cocatalysts of the invention are particularly advantageous in having a much smaller effect of concentration (or alkyl metal/Ti) on stereospecificity, thereby simplifying plant operation and permitting better control of product quality. The results are summarized in Table II for di-sec-butyl aluminum ethyl in contrast to AlEt$_3$ using the propylene polymerization procedure of Example 2.

TABLE II

| Run | Al Alkyl | Conc., mM | Rate | % HI |
|---|---|---|---|---|
| F | s-Bu$_2$AlEt | 2 | 357 | 93.0 |
| G | s-Bu$_2$AlEt | 4 | 484 | 83.4 |
| H | AlEt$_3$ Control | 2 | 344 | 83.1 |
| I | AlEt$_3$ Control | 4 | 290 | 64.9 |

The above examples illustrate that trialkyl aluminum compounds containing at least one secondary alkyl group are superior cocatalysts in Ziegler type polymerizations of alpha olefins and that di-secondary alkyl aluminum compounds are preferred.

EXAMPLE 5

Various secondary norbornyl aluminum n-alkyl compounds were prepared by reacting the stoichiometric proportions of a norbornene compound with either i-Bu$_2$AlH or AlEt$_3$ at elevated temperatures and removing unreacted materials by vacuum stripping. Structures were shown by $^1$H and $^{13}$C NMR to be the expected addition products of Al-H or Al-Et across the norbornene double bond. These mono and di-secondary alkyl aluminum compounds were used in propylene polymerization following the procedure of Example 2.

TABLE III

| Run | Al Alkyl | Rate | % HI |
|---|---|---|---|
| J | 2-Norbornyl AliBu$_2$* | 344 | 90.2 |
| K | (2-Norbornyl)$_2$AliBu* | 247 | 91.8 |
| L | 3-Ethyl-2-norbornyl AlEt$_2$* | 322 | 92.5 |
| M | 3-Ethyl-5-ethylidine-2-norbornyl AlEt$_2$* | 247 | 93.7 |

*Other isomers may also be present.

Comparison with the AlEt$_3$ control (Run C, Example 2) shows that all of the secondary norbornyl aluminum alkyls gave markedly higher heptane insolubles while retaining high activity.

EXAMPLE 6

Sec-alkyl aluminum hydrides also give improved results compared to the closely related primary alkyl aluminum hydride (i-Bu$_2$AlH), following the procedure of Example 2.

TABLE IV

| Run | Al Alkyl | Rate | % HI |
|---|---|---|---|
| N | i-Bu$_2$AlH control | 456 | 83.1 |
| O | s-Bu$_{2.6}$AlH$_{0.4}$ | 462 | 85.8 |
| P* | AlEt$_3$ control | 241 | 82.3 |
| Q* | iBu$_3$Al control | 264 | 89.3 |
| R* | s-Bu$_{2.6}$Al$_{0.4}$ | 284 | 90.7 |
| S* | 2-Bu$_{2.3}$AlH$_{0.7}$ | 223 | 90.1 |

*Another catalyst preparation was used. It was made by ball milling 5 moles MgCl$_2$ with 1 mole ethylbenzoate for one day, adding 1 mole TiCl$_4$ and milling 3 days, then treating with neat TiCl$_4$ at 80° C., 2 hours, washing with heptane and vacuum dried. The catalyst contained 3.44% Ti.

Run O using sec-butyl groups gave higher activity and stereospecificity than Run N using the closely related, but primary, isobutyl groups. Improved results are also seen versus the AlEt$_3$ control using the same supported titanium catalyst (Example 2, Run C).

Runs R and S show substantially higher heptane insolubles using two different sec-butyl aluminum hydrides compared to control Runs P and Q using AlEt$_3$ and iBu$_3$Al with the same catalyst.

EXAMPLE 7

The procedure of Example 2 was followed except that various Lewis bases were mixed with the aluminum alkyl solution before charging to the reactor.

TABLE V

| Run | Al Alkyl | mmoles Base | Rate | % HI |
|---|---|---|---|---|
| T | AlEt$_3$ control | 0.16 Et$_2$O | 358 | 84.7 |
| U | s-Bu$_2$AlEt | 0.16 Et$_2$O | 289 | 94.4 |
| V | t-Bu$_2$AlEt | 0.1 Me p-toluate | 327 | 94.0 |
| W | t-Bu$_2$AlEt | 0.3 Et p-anisate | 79 | 97.3 |
| X | t-Bu$_2$AlEt | 0.9 Et$_2$O | 56 | 98.0 |
| Y | t-BuAlEt$_2$ | 0.9 Et$_2$O | 101 | 97.1 |

TABLE V-continued

| Run | Al Alkyl | mmoles Base | Rate | % HI |
|---|---|---|---|---|
| Z* | t-Bu$_2$AlEt | 0.2 acetophenone | 196 | 94.2 |
| AA* | t-Bu$_2$AlEt | 0.2 ethylacetate | 74 | 97.6 |

*Used catalyst preparation described in Example 6, Runs P-S.

The improved stereospecificities obtained with the cocatalysts of this invention are further increased by the addition of Lewis bases (Runs U-AA versus control Runs T and Example 2, Run C). At the higher amounts of base, 97-98% HI was obtained, which is sufficiently high to eliminate the need for rejection of atactic polymer and greatly simplify the process. Activity is decreased somewhat, but it is still 3-5 times that of the Et$_2$AlCl/TiCl$_3$.0.33AlCl$_3$ commercial catalyst (rate=20, HI=93). At somewhat lower base concentrations, activity is 10-20 times higher than the commercial catalyst while still achieving 1-2% higher heptane insolubles.

EXAMPLE 8

Following the procedures of Example 2 and Example 7, improved stereospecificity is also obtained using t-Bu$_2$InEt cocatalyst.

EXAMPLE 9

The procedure of Example 6, Runs P-S was followed except that 9-i-Bu-9-alumino-3,3,1-bicyclononane was used as cocatalyst. Polymerization rate=97.5 g/g catalyst/hour; HI=85.1%.

EXAMPLE 10

The procedure of Example 9 was followed except that t-Bu$_2$Al (n-octyl) was used as cocatalyst. The rate was 212 g/g catalyst/hour; HI=93.0%.

EXAMPLE 11

Polymerizations were carried out in a 1 liter baffled resin flask fitted with an efficient reflux condenser and a high speed stirrer. In a standard procedure for propylene polymerizations, 475 ml n-heptane (<1 ppm water) containing 10 mmole Et$_2$AlCl (1.20 g), or the mixture of cocatalysts, was charged to the reactor under dry N$_2$, heated to reaction temperature (65° C.) and saturated with pure propylene at 765 mm pressure. The TiCl$_3$ (1.00 g) (6.5 mmole) was charged to a catalyst tube containing a stopcock and a rubber septum cap. Polymerization started when the TiCl$_3$ was rinsed into the reactor with 25 ml n-heptane from a syringe. Propylene feed rate was adjusted to maintain an exit gas rate of 200-500 cc/min at a pressure of 765 mm. After one hour at temperature and pressure, the reactor slurry was poured into one liter isopropyl alcohol, stirred 2-4 hours, filtered, washed with alcohol and vacuum dried.

The TiCl$_3$ was prepared by reduction of TiCl$_4$ with Et$_2$AlCl followed by treatment with diisopentyl ether and TiCl$_4$ under controlled conditions, yielding a high surface area delta TiCl$_3$ having low aluminum content.

The sec-butyl magnesium in Runs B, D and E was obtained from Orgmet and contained 72% non volatile material in excess of the s-Bu$_2$Mg determined by titration. IR, NMR and GC analyses showed the presence of butoxide groups and 0.07 mole diethyl ether per s-Bu$_2$Mg. A second sample of (s-Bu)$_2$Mg was used in Runs G and I. It was substantially pure s-Bu$_2$Mg but contained 0.33 mole diethyl ether per s-Bu$_2$Mg (Table VI).

TABLE VI

| Run | g TiCl₃ | Mmoles EtAlCl₂ | Mmoles (s-Bu)₂Mg | Mmoles Et₂AlCl | Rate g/gl hr | % HI |
|---|---|---|---|---|---|---|
| A(Control) | 1[a] | 0 | 0 | 10 | 33 | 95.2 |
| B | 1[a] | 5 | 5 | 0 | 152 | 52.6 |
| C(Control) | 1[b] | 0 | 0 | 10 | 85 | 96.3 |
| D | 0.2[b] | 0.4 | 0.2 | 1.6 | 123 | 88.0 |
| E | 0.2[b] | 2 | 2 | 0 | 210 | 49.2 |
| F(Control) | 1[c] | 0 | 0 | 5 | 8 | 79.5 |
| G | 1[c] | 2.5 | 2.5 | 0 | 36 | 57.6 |
| H(Control) | 1[d] | 0 | 0 | 10 | 20 | 91.7 |
| I | 0.2[d] | 1 | 1 | 0 | 200 | 57.4 |

[a] and [b] were different preparations of low aluminum TiCl₃ catalysts.
[c]Stauffer HA grade TiCl₃ (hydrogen-reduced, dry ball milled).
[d]Stauffer AA grade TiCl₃ . 0.33 AlCl₃ (aluminum-reduced, dry ball milled).

Comparison of Runs B, D, E, G and I with their respective control runs A, C, F and H shows that each type of TiCl₃ catalyst the novel cocatalyst combination gave 2–10 times higher activity than the customary Et₂AlCl cocatalyst.

The percent heptane insolubles (% HI) decreased substantially using the new cocatalysts. Thus, these high activity catalysts are attractive for making low crystallinity homopolymers of propylene and higher alpha olefins. They are particularly attractive for making thermoelastic polymers and amorphous copolymers and terpolymers for elastomers.

EXAMPLE 12

A titanium catalyst containing MgCl₂ was prepared by dry ball milling 4 days a mixture of anhydrous MgCl₂ (1 mole), TiCl₄ (1 mole) and δ-TiCl₃ (0.1 mole). Propylene was polymerized using the conditions in Example 11, Run B and the quantities shown in Table VII. Activity with the cocatalysts of this invention (Run L) was intermediate between those of the AlEt₃ and AlEt₂Cl controls (Runs J and K), but the stereospecificity as shown by % HI was much higher than the controls. The large increase in % HI obtained with this MgCl₂-containing catalyst is in contrast to the results in Example 1 using TiCl₃ catalysts in which activity increased sharply but % HI decreased.

TABLE VII

| Run | Catalyst | Alkyl Metals | Rate g/g Cat/hr | % HI |
|---|---|---|---|---|
| J(Control) | 1 | 10 AlEt₃ | 79 | 54.4 |
| K(Control) | 1 | 10 AlEt₂Cl | 18 | 35.8 |
| L | 0.2 | 1 AlEtCl₂ + 1 (s-Bu)₂Mg | 42 | 81.0 |

EXAMPLE 13

A titanium catalyst was prepared by dry ball milling 4 days a mixture of 5 MgCl₂, 1 TiCl₄ and 1 ethyl benzoate, heating a slurry of the solids in neat TiCl₄ 2 hours at 80° C., washing with n-heptane and vacuum drying. The catalyst contained 3.78% Ti.

Propylene was polymerized following the procedure of Example 11, Run B except that supported catalyst was used. As shown in Table VIII, all the control runs (M through S) gave substantially lower activity and/or % HI than the AlEtCl₂+s-Bu₂Mg combination (Run T) or AlCl₃+s-Bu₂Mg (Run U).

If the new cocatalysts simply reacted as the separate alkyl metal compounds, the results should have been like Runs M+Q. If the new cocatalysts simply reacted according to the equation: AlRCl₂+R₂Mg AlR₂Cl+RMgCl, then the results should have been like Runs N+P. However, the results in Run T and U are dramatically better, showing the completely unexpected formation of R₂AlR' as previously defined.

A much smaller synergistic effect was obtained by combining AlEt₂Cl+s-Bu₂Mg (Run S), but the results were poorer than those obtained with AlEt₃. Combining s-Bu₂Mg with AlEt₃ (Run R) destroyed the activity shown by AlEt₃ alone (Run O). Thus, the outstanding results were obtained only when M₂Mg was combined with RAlCl₂ or AlCl₃.

TABLE VIII

| Run | Catalyst | Mmoles Al Cpd | Mmoles Mg Cpd | Time Hrs. | Rate g/g Cat/hr | % HI |
|---|---|---|---|---|---|---|
| M(Control) | 0.2 | 1 AlEtCl₂ | — | 0.5 | 0 | — |
| N(Control) | 0.2 | 1 AlEt₂Cl | — | 1 | 47 | 61.1 |
| O(Control) | 0.2 | 1 AlEt₃ | — | 1 | 326 | 82.6 |
| P(Control) | 0.2 | — | 0.83 s-Bu MgCl | 0.25 | 0 | — |
| Q(Control) | 0.2 | — | 0.83 (s-Bu)₂Mg | 0.25 | 0 | — |
| R(Control) | 0.2 | 1 AlEt₃ | 0.83 (s-Bu)₂Mg | 0.25 | — | — |
| S(Control) | 0.2 | 1 AlEt₂Cl | 0.83 (s-Bu)₂Mg | 1 | 165 | 80.5 |
| T | 0.2 | 1 AlEtCl₂ | 0.83 (s-Bu)₂Mg | 1 | 367 | 91.9 |
| U | 0.2 | 1 AlCl₃ | 0.83 (s-Bu)₂Mg | 1 | 220 | 88.9 |

EXAMPLE 14

The procedure of Example 13 was followed using 0.2 g of the supported TiCl₄ catalyst together with (s-Bu)₂Mg and variations aluminum compounds.

TABLE IX

| Run | Mmoles Al Cpd | Mmoles (s-Bu)₂Mg | Time Hrs. | Rate g/g Cat/hr | % HI |
|---|---|---|---|---|---|
| V | 0.4 AlEtCl₂ | 0.33 | 1 | 60 | 94.5 |
| W | 1 AlEtCl₂ | 0.41 | 1 | 64 | 76.6 |
| X | 0.5 AlEtCl₂ | 0.83 | 1 | 260 | 87.2 |
| Y | 0.5 AlCl₃ | 0.83 | 2 | 136 | 90.7 |
| Z | 1 AlEtCl₂ + 1 AlEt₂Cl | 0.83 | 1 | 404 | 86.9 |
| AA | 1 AlEtBr₂ | 0.83 | 1 | 220 | 88.9 |
| BB | 1 AlC₈H₁₇Cl₂ | 0.83 | 1 | 425 | 88.0 |
| CC | 0.63 EtClAlN(iPr)₂ | 0.53 | 1 | 6 | — |
| DD | 1 Br₂AlN(iPr)₂ | 0.83 | 1 | 16 | — |

Comparison of Runs, V, W and X shows that the highest % HI is obtained at approximately equimolar amounts of RAlCl₂ and R₂Mg (Run V), that a large excess of RAlCl₂ is undesirable (Run W) and that a small excess of R₂Mg increases activity (Run X). Activity also increased upon addition of AlEt₂Cl to the AlEtCl₂-(s-Bu)₂Mg system (Run Z). The remainder of the experiments show that the dibromide may be used in place of dichloride (Run AA), that long chain alkyl aluminum compounds are very effective (Run BB), but that dialkyl amide groups on the aluminum compound destroy catalyst activity (Runs CC and DD).

EXAMPLE 15

The procedure of Example 13, Run T was followed except that Lewis bases were also added to the AlEtCl$_2$-(s-Bu)$_2$Mg cocatalysts.

Addition of Lewis bases causes a decrease in catalyst activity until it becomes zero at a mole ratio of one strong base per mole of RAlCl$_2$+R$_2$Mg (Table X).

TABLE X

| Run | Mmoles Base/(sec-Bu)$_2$Mg | Time, Hrs. | Rate g/g Cat/hr | % HI |
|---|---|---|---|---|
| EE | 0.24 φCOOEt[a] | 0.5 | 174 | 94.3 |
| FF | 0.5 Et$_3$N[b] | 1 | 62 | 85.5 |
| GG | 2 Diisopentyl ether | 1 | 127 | 78.8 |
| HH | 2 Tetrahydrofuran[c] | 1 | 0 | — |

[a]Added to the (s-Bu)$_2$Mg.
[b]Premixed total catalyst in 100 ml n-heptane at 65° C., 5 min. before adding Et$_3$N.
[c]Added to premixed AlEtCl$_2$-(s-Bu)$_2$Mg.

As shown in Run EE, small quantities of Lewis base are effective in improving isotacticity (94.3% HI vs. 91.9 in Run T) while maintaining high activity (nearly 9 times the conventional AlEt$_2$Cl/TiCl$_3$.0.33AlCl$_3$ catalyst, Example 11, Run H).

EXAMPLE 16

The procedure of Example 13, Run T was followed except that xylene diluent was used for polymerization instead of n-heptane. Activity was 676 g/g Cat/hr and the polymer gave 90.9% heptane insolubles. The polymer was precipitated with 1 liter isopropyl alcohol, filtered, dried and analyzed for metals. Found 13 ppm Ti and 83 ppm Mg. Thus at high monomer concentration and longer polymerization times the high efficiency would yield very low catalyst residues without deashing.

EXAMPLE 17

The procedure of Example 13, Run T was followed except that polymerization was carried out at 50° C. and 80° C. Both polymerization rate and % HI decreased with increasing temperature, with the largest decrease taking place above 65° C. (Table XI).

TABLE XI

| Run | Polymer Temp, °C. | Time Hours | Rate | % HI |
|---|---|---|---|---|
| II | 50 | 1 | 474 | 90.4 |
| T | 65 | 1 | 367 | 91.9 |
| JJ | 80 | 0.5 | 148 | 74.6 |

EXAMPLE 18

Propylene was polymerized at 690 kPa pressure in a stirred autoclave at 50° C., 1 hour. A second preparation of MgCl$_2$-containing TiCl$_4$ catalyst (2.68% Ti), made as in Example 13 except that TiCl$_4$-ethylbenzoate complex was preformed, was used in combination with AlRCl$_2$-R$_2$Mg. High stereospecificity was obtained at high rates and catalyst efficiencies (Table XII).

TABLE XII

| Run | g Cat. | Mmoles AlEtCl$_2$ | Mmoles (s-Bu$_2$)Mg | Rate | % HI |
|---|---|---|---|---|---|
| KK | 0.10 | 0.5 | 0.5 | 1672 | 88.8 |
| LL | 0.10 | 0.25 | 0.25 | 696 | 95.0 |

EXAMPLE 19

The procedure of Example 13, Run T was followed except that the catalyst of Example 18 was used and 1 mmole di-n-hexyl magnesium was used instead of 0.83 mmole (s-Bu)$_2$Mg. The (n-hexyl)$_2$Mg in Soltrol #10 was obtained from Ethyl Corporation (Lot No. BR-516). Polymerization rate was 551 g/g Cat/hr but the polymer gave 76.9% HI which is unacceptable. Thus n-alkyl magnesium compounds do not yield the high stereospecificity of the secondary and tertiary alkyl compounds of this invention.

EXAMPLE 20

The procedure of Example 15 Run EE was followed except that a new pure sample of (sec-Bu)$_2$Mg was used with 0.33 mole diethyl ether instead of ethyl benzoate and the reaction time was 1 hr. Rate was 268 g/g Cat/hr and % HI=92.2.

EXAMPLE 21

A catalyst was prepared by dry ball milling 4 days a mixture of 10 MgCl$_2$, 2 TiCl$_4$, 2 ethylbenzoate and 1 Mg powder, heating the solids in neat TiCl$_4$ 2 hours at 80° C., washing with n-heptane and vacuum drying (Ti=2.16%).

Propylene was polymerized 1 hour at 65° C. and atmospheric pressure using 0.20 g of this catalyst under the conditions of Example 13, Run T except only 0.4 mmole (s-Bu)$_2$Mg and 0.4 mmole AlEtCl$_2$ was used. Rate was 240 g/g Cat/hr and % HI=93.9.

EXAMPLE 22

A catalyst was prepared by dry ball milling 1 day a mixture of 5 MgCl$_2$ and 1 ethylbenzoate, adding 1 TiCl$_4$ and milling an additional 3 days, then treating the solids with neat TiCl$_4$ 2 hours at 80° C., washing with n-heptane and vacuum drying (3.44% Ti).

Propylene was polymerized following the procedure of Example 13, Run T, except that 1 mmole (s-Bu)$_2$Mg was used instead of 0.83 mmole. Rate was 298 g/g Cat/hr and % HI=89.

EXAMPLE 23

Following the procedure in Example 18, two catalysts were made at different Mg/Ti ratios. Catalyst A was made with 1 MgCl$_2$+1 TiCl$_4$-ethylbenzoate and B (2.10% Ti) was made with 10 MgCl$_2$+1 TiCl$_4$-ethylbenzoate complex. Propylene was polymerized following the procedure of Example 13, Run T (Table XIII).

TABLE XIII

| Run | g Cat | Mmoles AlEtCl$_2$ | Mmoles (s-Bu)$_2$Mg | Rate | % HI |
|---|---|---|---|---|---|
| MM | 0.107A | 2 | 1.66 | 60 | 72.0 |
| NN | 0.316B | 0.25 | 0.25 | 512 | 60.4 |
| OO[a] | 0.316B | 0.25 | 0.25 | 124 | 84.2 |

[a]Added 0.25 mmole triethylamine to the alkyl metal cocatalysts.

These results show that the 1:1 and 10:1 MgCl$_2$:TiCl$_4$ catalyst preparations were not as effective as the 5:1 preparations in preceding examples.

EXAMPLE 24

Polymerizations were carried out in a 1 liter baffled resin flask fitted with a reflux condenser and stirrer. In a standard procedure for propylene polymerizations, 475 ml n-heptane (<1 ppm water) containing the alkyl metal cocatalysts was charged to the reactor under $N_2$, heated to reaction temperarture (65° C.) while saturating with propylene at 765 mm pressure. The powdered transition metal catalyst was charged to a catalyst tube such that it could be rinsed into the reactor with 25 ml n-heptane from a syringe. The propylene feed rate was adjusted to maintain an exit gas rate of 200–500 cc/min. After one hour at temperature and pressure, the reactor slurry was poured into 1 liter isopropyl alcohol, stirred 2–4 hours, filtered, washed with alcohol and vacuum dried.

A titanium catalyst supported on $MgCl_2$ was prepared by combining 5 $MgCl_2$, 1 $TiCl_4$ and 1 ethylbenzoate, dry ball milling 4 days, heating a slurry of the solids in neat $TiCl_4$ 2 hours at 80° C., washing with n-heptane and vacuum drying. The catalyst contained 3.78% Ti. Portions of this catalyst preparation were used in the experiments shown in Table XIV. Various control runs are shown for comparison with the cocatalysts of this invention (Runs A-F).

The sec-butyl magnesium was obtained from Orgmet and contained 72% non volatile material in excess of the s-$Bu_2Mg$ determined by titration. IR, NMR and GC analyses showed the presence of butoxide groups and 0.07 mole diethyl ether per s-$Bu_2Mg$. The various s-BuMgX compounds were prepared directly by reacting an equimolar amount of ROH, RSH, RCOOH, etc. with the s-$Bu_2Mg$.

TABLE XIV (0.2 g Catalyst, 500 ml n-$C_7$, 65° C., 1 hr.)

| Run | Mmoles Al Cpd | Mmoles Mg Cpd | Mmoles Base | Rate g/g Cat/hr | % HI |
|---|---|---|---|---|---|
| Control | 1 $AlEt_2Cl$ | — | — | 47 | 67.1 |
| Control | 1 $AlEt_3$ | — | — | 326 | 82.6 |
| Control | 1 $AlEt_2Cl$ | 0.83 (s-$Bu)_2Mg$ | — | 165 | 80.5 |
| Control | 1 $AlEt_3$ | 0.83 (s-$Bu)_2Mg$ | — | 6 | — |
| Control | — | 0.83 (s-$Bu)_2Mg$ | — | 0 | — |
| Control | — | 0.83 s-BuMgCl | — | 0 | — |
| A | 1 $AlEt_2Cl$ | 1 s-Bu Mg OOC$\phi$ | — | 165 | 95.2 |
| B | 1 $AlEt_2Cl$ | 1 s-Bu Mg $OC_{15}H_{31}$ | — | 276 | 91.7 |
| C | 1 $AlEt_2Cl$ | 1 s-Bu Mg $OC_2H_5$ | — | 261 | 91.4 |
| D | 1 $AlEt_2Cl$ | 1 s-Bu Mg $SC_{12}H_{25}$ | — | 310 | 93.2 |
| E | 1 $AlEt_2Cl$ | 0.83 s-Bu MgCl | 1 $Et_3N$ | 100 | 94.6 |
| F | 1 $Et_2AlOOC\phi$ + 1 Et (s-Bu)AlCl | 1 s-BuMgCl | — | 351 | 90.5 |

Compared to the control runs, which gave either low activity or low percent heptane insolubles (% HI), the new cocatalyst combinations gave high activity and stereospecificity (>90% HI).

EXAMPLE 25

A second catalyst preparation 2.68% Ti was made following the procedure of Example 24 except that a preformed 1:1 complex of $TiCl_4.\phi COOEt$ was used. In Runs G and H, the s-$BuMgCl.Et_2O$ was obtained by vacuum stripping an ether solution of the Grignard reagent. In Run I, the n+s $BuMgOOCC_6H_5$ was made by reacting pure (n+s $Bu)_2Mg$ with benzoic acid. Propylene polymerizations were carried out as in Example 24 (Table XV).

TABLE XV

| Run | Mmoles Al Cpd | Mmoles Mg Cpd | Mmoles Base | Rate g/g Cat/hr. | % HI |
|---|---|---|---|---|---|
| G | 1 $AlEtCl_2$ | 1 s-BuMgCl | 1 $Et_2O$ | 0 | — |
| H | 1 $AlEt_2Cl$ | 1 s-BuMgCl | 1 $Et_2O$ | 132 | 93.1 |
| I | 1 $AlEt_3$ | 1 n + s-Bu | — | 123 | 89.7 |
| | | $MgOOCC_6H_5$ | | | |

Run G shows that monoalkyl aluminum compounds are not effective in combination with the mono-organomagnesium compounds in this invention. In contrast, Example 13, Run T, shows that such monoalkyl aluminum compounds are preferred when diorganomagnesium compounds are used.

Runs H and I show that dialkyl and trialkyl aluminum compounds are required with monoalkyl magnesium compounds.

EXAMPLE 26

Propylene was polymerized at 690 kPa pressure in a 1 liter stirred autoclave at 50° C. for 1 hour using the supported $TiCl_4$ catalyst of Example 25 (Table XV). The Mg compound was made as in Example 24, Run A.

TABLE XVI

| Run | g Cat. | Mmoles Mg Cpd | Mmoles $AlEt_2Cl$ | Solvent | Rate | % HI |
|---|---|---|---|---|---|---|
| J | 0.05 | 0.5 s-BuMgOOC$\phi$ | 0.5 | n-$C_7$ | 1292 | 89.9 |
| K | 0.10 | 0.4 s-BuMgOOC$\phi$ | 0.4 | n-$C_7$ | 317 | 96.9 |
| L | 0.10 | 0.4 s-BuMgOOC$\phi$ | 0.4 | xylene | 517 | 96.5 |

Comparison of Runs J and K shows that the lower alkyl metal/catalyst ratio in K gave higher heptane insolubles. Run L in xylene diluent gave higher activity than K in heptane.

EXAMPLE 27

The procedure of Example 25 was followed except that organomagnesium compounds containing alkoxy and benzoate groups were used in combination with $AlEt_2Cl$ together with diethyl ether. The s-BuMgOsBu was prepared by reacting a dilute solution of $sBu_2Mg$ containing 0.33 $Et_2O$ with one mole s-BuOH and used without isolation (Run M). The mixture in Run N was prepared in a similar manner by reacting 1.55 mmole n+s $Bu_2Mg$ with 1.10 s-butanol, adding 0.066 $Et_2O$, then adding this product to a solution of 1 benzoic acid in 275 ml n-heptane.

TABLE XVII

| Run | Mmoles Mg Cpd | Mmoles $AlEt_2Cl$ | Mmoles $Et_2O$ | Rate | % HI |
|---|---|---|---|---|---|
| M | 1 s-BuMgOs-Bu | 1 | ⅓ | 107 | 94.6 |

TABLE XVII-continued

| Run | Mmoles Mg Cpd | Mmoles AlEt$_2$Cl | Mmoles Et$_2$O | Rate | % HI |
|---|---|---|---|---|---|
| N | 0.45 n + s BuMgOOC$\phi$ 0.55 n + s BuMgOsBu 0.55 s-BuOMgOOC$\phi$ | 1 | 0.066 | 101 | 95.9 |

Comparison with Example 25, Run H shows that superior results were obtained with smaller amounts of diethyl ether by using alkoxide and carboxylate salts instead of the chloride.

EXAMPLE 28

The procedure of Example 7, Run Z was followed except that 0.25 mmole Mg(OOCC$_6$H$_5$)$_2$ was used in place of acetophenone as the third component. The magnesium benzoate was prepared from a dilute heptane solution of benzoic acid and n+s Bu$_2$Mg. The t-Bu$_2$AlEt was added to the milky slurry of Mg(OOCC$_6$H$_5$)$_2$, charged to the reactor and heated to 65° C., 5 min., after which the supported titanium catalyst was added.

The propylene polymerization rate was 122 g/g Cat/hr and polymer HI=97.7%.

EXAMPLE 29

The procedure of Example 6, Run P, was followed except that magnesium benzoate was used as a cocatalyst modifier. The magnesium salt was made in situ by reacting a hydrocarbon solution of (n+s-Bu)$_2$Mg with two moles of benzoic acid. The salt slurry was reacted with the alkyl metal cocatalyst in 500 ml n-heptane at 25° to 65° C. to obtain a soluble product before the catalyst was added.

TABLE XVIII

| Run | Mmoles Al Cpd | Mmoles Mg(OOC$\phi$)$_2$ | Rate | % HI |
|---|---|---|---|---|
| A(Control) | 1 AlEt$_3$ | — | 241 | 82.3 |
| B | 1 AlEt$_3$ | 0.25 | 210 | 93.0 |
| C | 1 AlEt$_3$ | 0.50 | 0 | — |
| D(Control) | 1 t-Bu$_2$AlEt | — | 248 | 93.8 |
| E | 1 t-Bu$_2$AlEt | 0.25 | 125 | 97.7 |

When used in small amounts relative to the aluminum trialkyl cocatalyst, the magnesium benzoate sharply increased stereospecificity as measured by the percent boiling heptane insolubles (Runs B and E vs. A and D). Activity decreased somewhat, but the results for both rate and % HI were superior to those of conventional TiCl$_3$ catalysts (Example 11, Runs A, C, F and H). At a ratio of 0.5 Mg(OOC$\phi$)$_2$ to AlEt$_3$, the catalyst was inactive (Run C). The modifier was effective with both types of aluminum trialkyls, but it gave the highest stereospecificity with the novel trialkyl aluminum cocatalysts of this invention.

EXAMPLE 30

The procedure of Example 29, Run B, was followed using various metal carboxylates as cocatalyst modifiers.

TABLE XIX

| Run | Mmoles Salt | Rate | % HI |
|---|---|---|---|
| F | 0.25 Mg acetate | 175 | 94.7 |
| G | 0.25 Mg neodecanoate | 235 | 91.8 |

TABLE XIX-continued

| Run | Mmoles Salt | Rate | % HI |
|---|---|---|---|
| H | 0.25 Na stearate | 206 | 92.4 |
| I | 0.25 K neodecanoate | 211 | 90.8 |

Comparison with control Run A, Example 29, shows that much higher % HI was obtained while still retaining high activity.

EXAMPLE 31

The procedure of Example 29 was followed except that various dialkyl aluminum carboxylates were used instead of the magnesium salt. The aluminum trialkyl and carboxylate were premixed 3–5 minutes at 25° C. in 30 ml n-heptanes.

TABLE XX

| Run | Mmoles Al Cpd | Mmoles Carboxylate | Rate | % HI |
|---|---|---|---|---|
| J | 1 AlEt$_3$ | 1 Et$_2$AlOOC$\phi$ | 130 | 97.4 |
| K | 1 AlEt$_3$ | 1 s-Bu$_2$AlOOC$\phi$ | 232 | 95.5 |
| L | 1 s-Bu$_2$AlEt | 1 Et$_2$AlOOC$\phi$ | 246 | 94.4 |
| M | 1 s-Bu$_2$AlEt | 1 s-Bu$_2$AlOOC$\phi$ | 276 | 91.4 |
| N | 1 AlEt$_3$ | 1 Et$_2$AlOOCC$_6$H$_3$Me$_2$-2,6 | 262 | 89.1 |
| O | 1 s-Bu$_2$AlEt | 1 Et$_2$AlOOCC$_6$H$_3$Me$_2$-2,6 | 310 | 77.7 |
| P | 1 AlEt$_3$[a] | 1 Et$_2$AlOOC$\phi$[a] | 70 | 97.8 |
| Q | 2 AlEt$_3$[b] | 1 Et$_2$AlOOC$\phi$[b] | 239 | 93.1 |
| R | — | 1 s-Bu$_2$AlOOC$\phi$ | 0 | — |

[a]Premixed 5 minutes in 30 ml n-heptane at 40–50° C.
[b]Premixed in 30 ml n-heptane at 60° C., 30 minutes.

Comparison with control Run A, Example 29, shows that increased stereospecificity was obtained with all of the alkyl aluminum carboxylates except in Run O. Higher activities were also obtained in some cases, especially with the 2,6-dimethylbenzoates (Runs N and O). The ortho substituents are believed to hinder the carbonyl addition reaction which leads to lower activity by consumption of the aluminum trialkyl. Support for this type of side reaction can be seen in the low activity in Run P, premixed in concentrated solution, compared to Run J which was premixed in 500 ml n-heptane. When sufficient excess AlR$_3$ is used in a concentrated premix with the aluminum benzoate, one regains activity, but the modifier is presumed to be the aluminum alkoxide products from the carbonyl addition reaction. Run R shows that the carboxylate compound alone is not a cocatalyst, so that the improved results obtained when mixed with AlR$_3$ must be due to the reaction of the AlR$_3$ with the carboxylate modifier.

EXAMPLE 32

The procedure of Example 29 was followed except that tertiary butyl aluminum compounds were used and the ratio of aluminum trialkyl to aluminum benzoate was varied.

TABLE XXI

| Run | Mmoles Al Cpd | Mmoles Carboxylate[a] | Rate | % HI |
|---|---|---|---|---|
| S | 1 t-Bu$_2$AlEt | 0.25 t-Bu$_2$AlOOC$\phi$ | 221 | 93.4 |
| T | 1 t-Bu$_2$AlEt | 0.50 t-Bu$_2$AlOOC$\phi$ | 227 | 94.9 |
| U | 1 t-Bu$_2$AlEt | 1.0 t-Bu$_2$AlOOC$\phi$ | 184 | 94.6 |

[a]May contain same t-Bu EtAlOOC$\phi$ as it was prepared by reacting t-Bu$_2$AlEt with $\phi$COOH.

Comparison with Example 29 shows that the dialkyl aluminum benzoates were not as efficient as magnesium benzoate, and higher ratios were needed to achieve higher stereospecificity.

EXAMPLE 33

The procedure of Example 6, Run P, was followed except that dialkyl aluminum alkoxides were used as cocatalyst modifiers.

TABLE XXII

| Run | Mmoles AlR$_3$ | Mmoles Al Alkoxide | Rate | % HI |
|---|---|---|---|---|
| V | 0.8 t-Bu$_2$AlEt | 0.2 t-Bu$_2$AlOCMeEt$\phi$ | 196 | 94.2 |
| W | 0.8 t-Bu$_2$AlEt | 0.2 t-Bu$_2$AlOCEt$\phi_2$ | 191 | 94.6 |
| X* | 1 AlEt$_3$ | — | 506 | 81.6 |
| Y* | 1 AlEt$_3$ | 10 Et$_2$AlOC$_{15}$H$_{31}$ | 113 | 95.5 |

*Another catalyst preparation was used (contained 3.16% Ti).

Comparison of Runs V and W with control run D, Example 29, shows that the alkoxide additives increased stereospecificity as measured by heptane insolubles. This was also true for Run Y versus its control (Run X). In this case, a large excess of alkoxide was used relative to the AlR$_3$. These results are opposite to those using unsupported TiCl$_3$ catalysts in which it is known that dialkyl aluminum alkoxide cocatalysts produce low heptane insoluble products.

EXAMPLE 34

The procedure of Example 33 was followed using another catalyst preparation having 3.38% Ti and using a hindered Lewis base in place of the Al alkoxide.

TABLE XXIII

| Run | Mmoles AlEt$_3$ | | Rate | % HI |
|---|---|---|---|---|
| | | Mmoles Hindered Base | | |
| E | 1 | 2 Tetramethyl THF$^{(1)}$ | 277 | 94.1 |
| F | 1 | 1 Tetramethylpiperidine$^{(2)}$ | 402 | 95.5 |
| G | 1 | 2 i Pr$_2$NEt | 289 | 95.3 |
| H | 1 | 1 Di-orthotolylamine | 309 | 93.4 |
| | | Mmoles Unhindered Base | | |
| Control | 1 | 1 MeOt-Bu | 129 | 91.3 |
| Control | 1 | 1 Met-BuNH | 11 | 95.5 |
| Control | 1 | 1.06 Et$_3$N | 38 | 97.0 |
| Control | 1 | 1 2,6-Di-t-butylpyridine | 487 | 84.8 |
| Control | 1 | | 481 | 81.8 |

$^{(1)}$2,2,5,5-tetramethyltetrahydrofuran.
$^{(2)}$2,2,6,6-tetramethylpiperidine.

Comparison with the Control Run without a hindered base shows that the hindered bases (Runs E-H) gave both high activity and high HI, whereas the control runs with unhindered bases gave improved HI but with a serious loss of activity. The completely hindered 2,6-di-t-butylpyridine had little effect on either rate or HI.

EXAMPLE 35

The procedure of Example 34 was followed except that the catalyst preparation of Example 33, Run X, was used.

TABLE XXIV

| Run | Mmoles AlR$_3$ | | Rate | % HI |
|---|---|---|---|---|
| | | Mmoles Hindered Base | | |
| I | 1 AlEt$_3$ | 1 Diphenylamine | 233 | 95.6 |
| J | 1 AlEt$_3$ | 2 Tetramethylpiperidine | 292 | 97.1 |
| K | 1 sBu$_2$AlEt | 1 Tetramethylpiperidine | 302 | 95.0 |
| L | 1 i Bu$_3$Al | 1 Tetramethylpiperidine | 423 | 97.1 |
| | | Mmoles Unhindered Base | | |
| Control | 1 sBu$_2$AlEt | 1 2,6-Dimethylpiperidine | 4 | 85.4 |
| Control | 1 AlEt$_3$ | 1 Ethylbenzoate | 0 | — |
| Control | 5 AlEt$_3$ | 4 Tetrahydrofuran | 100 | 83.0 |

Comparison with Control Run X of Example 33 shows that the hindered bases gave both high activity and high HI, whereas the unhindered bases gave both low activity and HI.

EXAMPLE 36

The procedure of Example 34 was followed using various alkyl metal compounds, Lewis bases and base concentrations.

TABLE XXV

| Run | Mmoles AlR$_3$ | Mmoles Hindered Base | Rate | % HI |
|---|---|---|---|---|
| M | 1 AlEt$_3$ | 0.2 Tetramethylpiperidine | 441 | 94.7 |
| N | 1 AlEt$_3$ | 1 t-Bu(i-Pr)NH | 279 | 95.4 |
| O | 1 AliBu$_3$ | 1 i-Pr$_2$NMe | 367 | 94.0 |
| P | 1 AliBu$_3$ | 0.2 C$_6$H$_5$CH$_2$(t-Bu)NH | 407 | 94.6 |
| Q | 1 AlsecBu$_3$ | 1 Tetramethylpiperidine | 291 | 96.7 |
| Control | 1 AliBu$_3$ | | 500 | 89.7 |
| Control | 1 AlsecBu$_3$ | | 461 | 91.6 |

Comparison with the control runs (AlEt$_3$ control in Example 34) shows that the hindered bases gave major increases in isotactivity, as measured by the present heptane insoluble, with only a minor loss of activity.

EXAMPLE 37

Polymerization was carried out in liquid propylene using a mixture of an unhindered base plus a hindered base. A 1-liter reactor was charged with AlEt$_3$, 2,2,6,6-tetramethylpiperidine (TMPip) (hindered base) and ethylbenzoate (EB) (unhindered base) in a few ml n-heptane. Liquid propylene (500 ml at about 7° C.) was added rapidly and the temperature was increased rapidly to 65° C., the catalyst was added and the temperature was maintained at 65° C.

TABLE XXVI

| Run | Cat. mg. | Cocatalyst, mmoles AlEt$_3$ | TMPiP | EB | Time min. | Rate g/g Cat/hr. | % HI |
|---|---|---|---|---|---|---|---|
| R | 15 | 0.3 | 0.9 | 0.01 | 30 | 11500 | 95.0 |
| S | 10 | 0.2 | 0 | 0.02 | 30 | 18300 | 87.9 |
| T | 15 | 0.3 | 0.9 | 0 | 30 | 13800 | 92.4 |
| Control | 10 | 0.2 | 0 | 0 | 27 | 20600 | 68.6 |

Run R contained both hindered and unhindered bases added with the cocatalyst and gave outstanding results compared to S or T, in which one of the bases was omitted. All three experiments gave greatly improved stereospecificity (% HI) compared to the control run in which no bases were added with the cocatalyst. The catalyst component, contained about 18 wt. % ethylbenzoate but this was ineffective for producing high HI as shown by the control run.

The results in Run R were surprising since they show that the use of the two types of Lewis bases gave significantly better results than would be expected based on the results from each base alone.

Since many modifications and variations of this invention may be made without departing from the spirit or scope of the invention thereof, it is not intended to limit the spirit or scope thereof to the specific examples thereof.

What is claimed is:

1. An improved catalyst composition which comprises a mixture of:
   (a) at least one alkyl metal compound having the formula R'''$_3$M, wherein M=Al, Ga or In, R''' is selected from the group consisting of C$_1$ to C$_{20}$ primary, branched primary, secondary, or tertiary alkyl, cycloalkyl, alkenyl and aralkyl groups and hydride and mixtures thereof;
   (b) a transition metal compound on a layer lattice support, a molar ratio of said R'''$_3$M to said transition metal compound being about 0.5:1 to 200:1; and
   (c) at least one hindered Lewis base, said hindered Lewis base not causing excessive cleavage of metal-carbon bonds or loss of active sites under polymerization conditions said hindered Lewis bases being those whose complexing ability toward the R'''$_3$M is hindered sufficiently by steric and/or electronic effects to cause appreciable dissociation of the trialkyl metal-Lewis base complex under polymerization conditions; and
   (d) at least one unhindered Lewis base, said unhindered base not causing excessive cleavage of metal-carbon bonds or loss of active sites under polymerization conditions.

2. The composition of claim 1 wherein said transition metal compound is a transition metal halide.

3. The composition of claims 1 or 2 wherein said support is MgCl$_2$.

4. The composition of claim 1 wherein said transition metal compound is selected from the group consisting of TiCl$_3$, TiCl$_4$, TiBr$_3$ and TiBr$_4$ and mixtures thereof.

5. The composition of claim 1 wherein said hindered Lewis base is selected from the group consisting of piperidines, pyrrolidines, ketones, tetrahydrofurans, secondary and tertiary aromatic amines and tertiary aliphatic amines.

6. The composition of claim 1 wherein said hindered Lewis base is selected from the group consisting of 2,2,6,6-tetramethylpiperidine, 2,2,5,5-tetramethylpyrrolidine, 2,2,5,5-tetramethyltetrahydrofuran, di-tert-butylketone and 2-6-diisopropylpiperidine.

7. The composition of claim 1 wherein said hindered Lewis base is selected from the group consisting of orthotolyl t-butylketone, methyl 2,6-di-tert-butylphenylketone, diisopropylethylamine, t-butyldimethylamine, and 6-methyl-2-isopropylpyridine.

8. The composition of claim 1 wherein said hindered Lewis base is selected from the group consisting of diphenylamine, di-ortho-tolylamine, N-N-diethylaniline, and di-orthotolylketone.

9. The composition of claim 1 wherein said hindered Lewis base is 2,2,6,6-tetramethylpiperidine.

10. The composition of claim 1 wherein said hindered Lewis base is 2,2,5,5-tetramethylpyrrolidine.

11. The composition of claim 1 wherein said transition metal compound is TiCl$_4$.

12. The composition of claim 1 wherein said R'''$_3$M contains at least one of said alkyl groups having about 2 to about 4 carbon atoms.

13. The composition of claim 11, further including TiCl$_3$.